Nov. 1, 1955   W. THOMSON ET AL   2,722,405
MACHINES FOR MIXING BATTER OR SIMILAR LIQUIDS
Filed Nov. 15, 1952   2 Sheets-Sheet 1
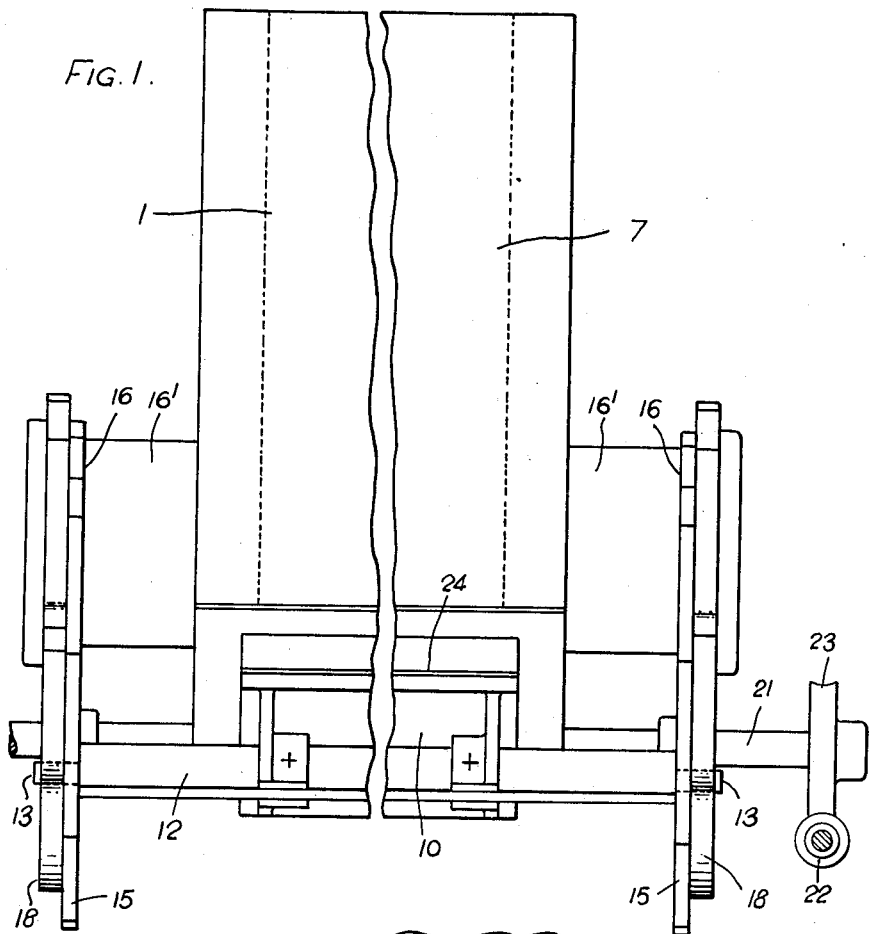
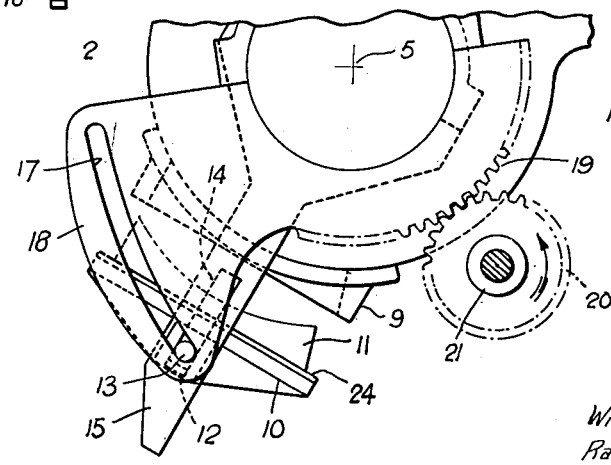
INVENTORS:
William Thomson
Raymond C. Leith
Robert Hepburn
By Emery, Holcombe & Blair
ATTORNEYS

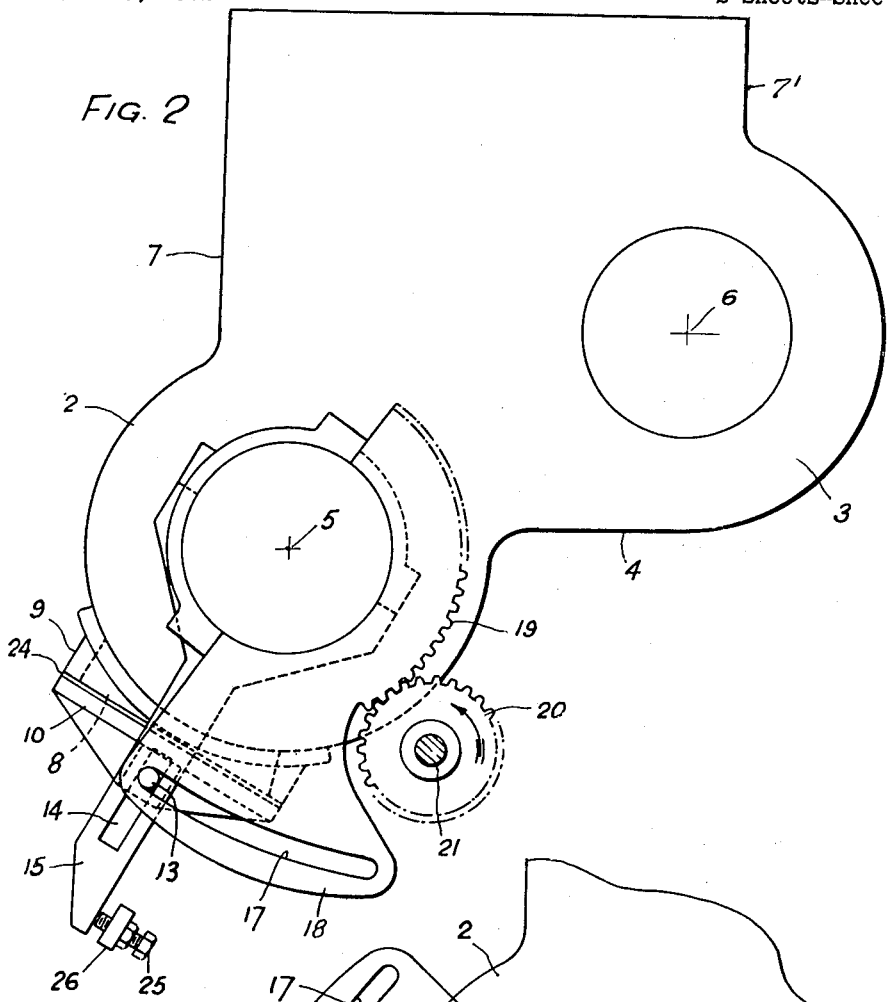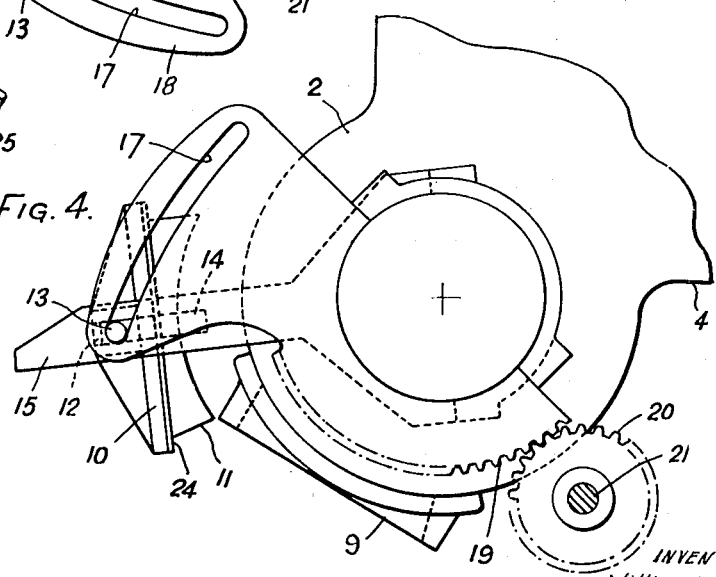

United States Patent Office 2,722,405
Patented Nov. 1, 1955

2,722,405

MACHINES FOR MIXING BATTER OR SIMILAR LIQUIDS

William Thomson and Raymond C. Leith, Glasgow, and Robert Hepburn, Hamilton, Scotland, assignors to Morton Machine Company Limited, Wishaw, Scotland Application November 15, 1952, Serial No. 320,762

Claims priority, application Great Britain November 16, 1951

4 Claims. (Cl. 259—41)

This invention relates to machines for mixing batter or similar liquids and has particular reference to machines for mixing flour and water to provide a batter which is subsequently kneaded. Known forms of such mixing machines which are referred to as duplex mixers, comprise a hopper which is tiltably mounted to permit the contents to be discharged after mixing and two rotatable beaters are accommodated within the hopper at the bottom. The beaters are mounted on shafts, the axes of which lie in the same plane and it is usual to rotate one of the beaters at a higher speed than the other.

The object of the present invention is to provide a novel construction of mixing machine in which the hopper is fixed, and which does not require to be tilted to discharge the contents but which nevertheless ensures complete discharge of the mixed material, the construction being such that mixed materials may be easily removed through the base of the hopper in which the materials are mixed.

According to the present invention a batter mixing machine having a discharge opening in its botttom closed by a door, comprises a fixedly mounted hopper which accommodates at least one rotary beater at or near the bottom thereof adjacent to the discharge opening and at least one other rotary beater the axis of which lies at such a higher level with respect to that of the first mentioned beater, that the lowest sweep of the beater members of said other beater is at a higher level than the axis of the first mentioned beater.

According to one form of this invention, the lower part of the hopper is formed with a pair of beater compartments disposed in offset relation to each other both horizontally and vertically and connected with each other by a bottom wall disposed at a higher level than the axis of the beater mounted in the lower compartment.

The base of the hopper is provided with an inclined discharge opening closed by a door under the control of mechanism which is preferably so constructed that upon operation the door first moves in a direction normal to its plane of closure and then laterally with respect thereto so as to leave the discharge opening substantially unobstructed. When the mechanism is operated in the reverse direction the door executes the converse sequence of movements in order to close the discharge opening.

In order that the invention may be more fully understood, one example in accordance therewith will now be described by way of example with reference to the accompanying drawings, in which:

Fig. 1 is a front elevation of the lower part of a hopper provided with a closure door and operating mechanism therefor.

Fig. 2 is a side elevation corresponding to Fig. 1 and showing the door closed.

Figs. 3 and 4 are views similar to Fig. 2 but show respectively the door moved by its operating mechanism in a direction normal to the plane of closure and the door moved by such mechanism laterally clear of the discharge opening.

The lower part of the hopper 1 illustrated is of general rectangular form and is mounted in a manner not shown in a fixed position. The hopper 1 is formed with a pair of beater compartments 2, 3 disposed in offset relation to each other both horizontally and vertically and connected with each other by a bottom horizontal wall 4 which is disposed at a somewhat higher level than the axis 5 of a beater, not shown, but of normal construction and rotatably mounted in the compartment 2. Another beater not illustrated but also of known construction is rotatably mounted about an axis 6 in compartment 3. As more clearly illustrated in Fig. 2, the compartment 2 forms a substantially cylindrical enlargement of the hopper between the front vertical wall 7 and the bottom wall 4 thereof. Similarly, the compartment 3 is formed by a substantially cylindrical enlargement of the hopper 1 between the rear vertical wall 7' and the bottom wall 4. The relationship of the axes 5 and 6 and constructional dimensions of the hopper together with the beaters mounted on axes 5 and 6 are such that the floor 4 of the beater compartment 2 and the lowest sweep of the beater members in compartment 3 are both above the axis 5 of the beater in the lower compartment 2. In known manner, the lower beater in compartment 2 is rotated at a higher speed than the upper beater in compartment 3.

The hopper construction above described enables the mixing operations to be effectively performed in the compartments 2, 3 and has the prime advantage that the contents may be discharged from the compartment 2 without the necessity of tilting the hopper. For this purpose, the compartment 2 is provided with a discharge opening 8 which extends substantially the full width of the hopper 1 as considered with reference to Fig. 1, the discharge opening being of generally rectangular form with the top face of a door frame 9 parallel with the centre line of the door and the lower face inwardly tapering. The discharge opening 8 is offset with respect to the vertical plane passing through the axis 5 of the beater in the lower compartment 2 as clearly illustrated in Fig. 2, the plane of the discharge opening being approximately at an angle of 30° to the horizontal.

A door 10 formed with an inner portion 11 for fitting engagement with the discharge opening 8 is mounted on a bar 12, see particularly Fig. 1, extending longitudinally with respect to the door. The bar 12 extends beyond each side of the hopper 1 and has reduced ends 13, each of which passes through a slot 14 of an arm 15 which extends radially from a ring 16 rotatably mounted on a bearing 16' carried by the adjacent hopper side. The slot 14 extends longitudinally of each arm 15 as illustrated in Fig. 2. Each reduced end 13 of the door-supporting bar 12 also passes through an arcuate cam slot 17 formed in a plate 18 constituting an extension of a gear segment 19 rotatably mounted on bearing 16'. Each segment 19 is engaged by a pinion 20 mounted on a common shaft 21 which may be rotated through a worm and a worm wheel 22, 23 provided at one side of the hopper, see Fig. 1. The worm 22 may be operated by a hand wheel, not shown.

When the discharge opening 8 is closed by the door 10 the arm 15 and plate 18 together with their respective slots 14, 17 are related to one another as illustrated in Fig. 2 which shows the reduced end 13 of the door-supporting bar at the left hand end of the cam slot 17 and near the top end of the slot 14. With these positions of the parts, the door 10 is firmly closed with a rubber seal 24 interposed between the door 10 and the door frame 9.

When it is desired to discharge the contents of the hopper compartment 2, the shaft 21 is rotated through the worm and worm wheel 22, 23 in the direction of the arrow, Fig. 2, so as to rotate the plates 18 through pinions 20 and gear segments 19. In the first part of the movement of the plates 18, i. e. from the position illustrated in Fig. 2 to the position illustrated in Fig. 3, the cam slots 17 act on the reduced ends 13 of the door-supporting bar 12, thereby moving the door 10 in a direction normal to the plane of the discharge opening 8. The door portion 11 is thus removed from the discharge opening 8 as indicated in Fig. 3. In the continued rotation of the plates 18, the lower ends of the cam slots 17 act on the reduced ends 13 which are now near the lower ends of the longitudinal slots 14 in the arms 15. These arms are therefore caused to participate in the movement of the plates 18 and eventually reach the position illustrated in Fig. 4 which shows the door 10 swung completely clear of the discharge opening 8 so that no obstruction is offered to the free discharge of the contents of the lower hopper compartment 2. A reverse sequence of movement is effected when the shaft 21 is rotated in the reverse direction with respect to that indicated by the arrow in Fig. 2, thereby again effectively sealing the discharge opening 8. Adjustable screws 25 carried by a fixed bar 26, Fig. 2, serve as stops or abutments for the radial arms 15 in such reverse movement of the plates 18.

The operation of the shaft 21 by a hand wheel is not essential and may be effected by other mechanism, for instance, electrically or hydraulically operated mechanism.

We claim:

1. A batter mixing machine comprising a fixedly mounted hopper having a discharge opening in the base thereof, a first rotary beater mounted on a horizontal axis within the hopper and near the base thereof, a second rotary beater mounted within the hopper on an axis parallel to the axis on which said first beater is mounted and at such a position that the lowest sweep of the beater members of said second beater is at a higher level than the axis on which said first beater is mounted, a closure member for the discharge opening, a supporting bar extending laterally of the closure member, a bearing at each side of the hopper, an arm rotatably mounted on each bearing and formed with a longitudinal guideway engaging with one of the ends of the supporting bar, a plate rotatably mounted on each bearing and provided with a cam-shaped guideway also engaging with one of the ends of the supporting bar, rotation of the plates first causing the bar ends to move outwardly along the longitudinal guideways so as to move the closure member in a direction normal to its plane of closure and then swing the arms to positions at which the door becomes clear of the discharge opening.

2. A batter mixing machine as claimed in claim 1 in which gear segments are formed on the rotatable plates and operating pinions are provided for engagement therewith.

3. A batter mixing machine as claimed in claim 1 in which the mouth of the discharge opening lies in a plane which is inclined to the vertical plane passing through the axis on which said first beater is mounted.

4. A batter mixing machine as claimed in claim 1 in which the hopper is so formed that it comprises a lower compartment in which said first beater rotates and an upper compartment, horizontally, as well as vertically, displaced from the lower compartment, in which said second beater rotates, the two compartments being connected together with the bottom wall of the upper compartment lying at a level higher than that of the axis about which said first beater rotates.

References Cited in the file of this patent

UNITED STATES PATENTS

| | | |
|---|---|---|
| 891,468 | Dougan | June 23, 1908 |
| 1,737,301 | Eirick et al. | Nov. 26, 1929 |
| 2,403,536 | Lewis | July 9, 1946 |
| 2,435,229 | Mann | Feb. 3, 1948 |
| 2,507,522 | Heine | May 16, 1950 |
| 2,601,566 | Soderquist | June 24, 1952 |